United States Patent
Xu (10) Patent No.: US 10,471,341 B1
(45) Date of Patent: *Nov. 12, 2019

(54) PLATFORM TRIGGERED REGISTRATION

(71) Applicant: Electronic Arts Inc., Redwood City, CA (US)

(72) Inventor: Ziqiang Xu, Belmont, CA (US)

(73) Assignee: Electronic Arts Inc., Redwood City, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/101,152

(22) Filed: Dec. 9, 2013

Related U.S. Application Data (60) Provisional application No. 61/773,020, filed on Mar. 5, 2013.

(51) Int. Cl.
*A63F 13/79* (2014.01)
*A63F 13/40* (2014.01)

(52) U.S. Cl.
CPC .................... *A63F 13/10* (2013.01)

(58) Field of Classification Search
CPC ................ A63F 13/00; G06Q 30/00
See application file for complete search history.

(56) References Cited

U.S. PATENT DOCUMENTS

| | | | |
|---|---|---|---|
| 7,509,290 B1 | 3/2009 | McKee et al. | |
| 8,663,004 B1 | 3/2014 | Xu | |
| 2001/0039210 A1 | 11/2001 | St-Denis | |
| 2003/0017873 A1* | 1/2003 | Ohara | A63F 13/10 463/42 |
| 2003/0054878 A1 | 3/2003 | Benoy | |
| 2003/0181242 A1 | 9/2003 | Lee | |
| 2004/0106449 A1 | 6/2004 | Walker et al. | 463/25 |
| 2008/0194332 A1 | 8/2008 | Kadikario | |
| 2008/0234043 A1 | 9/2008 | McCaskey et al. | 463/29 |
| 2009/0215512 A1 | 8/2009 | Gannon | |
| 2009/0276351 A1 | 11/2009 | Faratin | |
| 2010/0036720 A1 | 2/2010 | Jain | |
| 2010/0056269 A1 | 3/2010 | Zalewski | |
| 2010/0107214 A1* | 4/2010 | Ganz | G06F 21/128 726/1 |
| 2011/0258684 A1 | 10/2011 | Ganz | 726/4 |

(Continued)

FOREIGN PATENT DOCUMENTS

KR 20110036315 A 4/2011

OTHER PUBLICATIONS

What is "Steam" and how does it work? AskUbuntu Jan. 10, 2013 http://askubuntu.com/questions/239422/what-is-steam-and-how-does-it-work.*

(Continued)

*Primary Examiner* — Tramar Y Harper
*Assistant Examiner* — Jeffrey K Wong
(74) *Attorney, Agent, or Firm* — Knobbe, Martens, Olson & Bear, LLP (57) ABSTRACT

This disclosure relates to enabling a user to access a game without registering for a platform account. In implementations, if an unregistered user attempts to access a game supported by a gaming platform, a guest account may be automatically created for the user in response to receiving a request for the user to access the game. The guest account may enable the user to access the game without first registering with the gaming platform.

14 Claims, 4 Drawing Sheets

(56) References Cited

U.S. PATENT DOCUMENTS

| | | | |
|---|---|---|---|
| 2011/0270718 A1* | 11/2011 | Ganz | G06Q 30/0222 |
| | | | 705/27.2 |
| 2012/0004041 A1 | 1/2012 | Pereira | |
| 2012/0265587 A1 | 10/2012 | Kinkead | |
| 2013/0005481 A1 | 1/2013 | Tagawa | |
| 2013/0073388 A1 | 3/2013 | Heath | |
| 2013/0084936 A1 | 4/2013 | Pease | |
| 2013/0097509 A1 | 4/2013 | Gomes | |
| 2013/0102372 A1 | 4/2013 | Lutnick | |
| 2013/0116038 A1 | 5/2013 | Alderucci | |
| 2013/0117832 A1* | 5/2013 | Gandhi | H04L 9/3271 |
| | | | 726/7 |
| 2013/0337898 A1 | 12/2013 | Kelly | |
| 2014/0075004 A1 | 3/2014 | Vandusen | |
| 2014/0121007 A1* | 5/2014 | Santini | G06Q 50/01 |
| | | | 463/29 |
| 2014/0179434 A1 | 6/2014 | Xu | |

OTHER PUBLICATIONS

Wayback Machine of What is "Steam" and how does it work? Jan. 16, 2013 https://web.archive.org/web/20130116233739/http://askubuntu.com/questions/239422/what-is-steam-and-how-does-it-work.*

* cited by examiner

PLATFORM TRIGGERED REGISTRATION

CROSS-REFERENCE TO RELATED APPLICATIONS

This application claims the benefit of U.S. Provisional Patent Application Ser. No. 61/773,020, entitled "Platform Triggered Registration", filed Mar. 5, 2013, which is hereby incorporated by reference into the present disclosure in its entirety.

FIELD OF THE DISCLOSURE

This disclosure relates to platform account registration for games, in which a platform registration request for a user is generated in response to satisfying a platform trigger.

BACKGROUND

Conventional online games are provided through gaming platforms, such as Facebook.com, Kabam.com, Zynga.com, Bigpoint Games, Steam, etc. Individual games that are accessed through the gaming platform may automatically create user accounts that are linked to an over-arching platform account for the users. For example, a platform account for a user may be linked to a host of individual game-level accounts for the user. By individual game user accounts being linked to the over-arching platform account for a user, the user is able to log into the gaming platform and access the individual games that are associated with the gaming platform.

However, conventional gaming platforms do not enable a user to access individual games until the user has registered a platform account. This requirement creates a barrier to entry for new users to access a game. Although an individual game hosted by a gaming platform may intrigue a user, the requirement that the user registers for a platform account before the user access the game may dissuade or discourage the user from accessing the game.

Accordingly, alternative approaches to providing access to games hosted on a gaming platform may lower the barrier for users to access the games, and may enable users to access the games without first registering a platform account.

SUMMARY

One aspect of this disclosure relates to enabling a user to access a game without first registering a platform account. In implementations, if an unregistered user attempts to access a game hosted by a gaming platform, a guest account may be automatically created for the user in response to receiving a user request to access the game. The guest account may enable the user to access the game without initially registering with the platform account. Thus, more users may be enabled to access games hosted by the gaming platform.

In implementations, a system may include one or more processors configured to execute computer program modules. The computing modules may include a game request module, a guest account module, a game access module, a progress monitor module, a platform trigger module, and a platform account module.

The game request module may be configured to receive user requests for access to games, and to determine whether users making the user requests are associated with registered platform accounts.

The guest account module may be configured to automatically create a guest platform account for a first user that is not associated with a registered platform account. The guest account module may create the guest account in response to reception of a user request from the first user for access to a first game, wherein the guest platform account includes a first identifier and lacks any stated information from the first user.

The game access module may be configured to provide access for users to games in response to receiving the user request for access to a game. In implementations, the game access module may be configured such that responsive to reception of the user request for access to a game from the first user, the game access module effectuates transmission of a first platform request to a game provider of the first game. The first platform request may include the first identifier and effectuate provision of the first game to the first user by the game provider. The game access module may also be configured to, responsive to reception of a user request for access to the first game from a second user that is associated with a registered platform account, effectuate transmission of a second platform request to the game provider of the first game. The second platform request may include a second identifier in the registered platform account and effectuate provision of the first game to the second user by the game provider.

The progress monitor module may be configured to monitor user usage of the games, such that responsive to access to the first game being provided to the first user, the progress monitor module may monitor usage of the first game by the first user. The platform trigger module may be configured to determine whether usage of the first game by the first user satisfies a platform trigger. The platform account registration module may be configured to generate a platform registration request for the first user in response to a determination that the platform trigger is met.

Implementations may include a channel module configured to determine a channel that presented a link through which the first user's request for access to the first game was received by the game request module. The channel module may also be configured to include the determined channel in the guest platform account. In embodiments, the platform trigger may be based on the channel that presented the link through which the first user's request for access to the first game was received. In implementations, the channel module may be further configured to determine an internet protocol address associated with the first user and to include the determined internet protocol address in the guest platform account. In embodiments, the platform trigger may be based on a location associated with the internet protocol address of the first user.

In implementations, the platform trigger is satisfied by the progress monitor module detecting the first user's usage of the first game exceeding a time limit and/or the first user requesting a specified in-game action in the first game. In implementations, the specified in-game action in the first game includes logging into the first game and/or making an in-game purchase. In implementations, the platform trigger may be based on whether the first user is a paying user on a game platform. In implementations, the platform account registration module may be further configured to receive stated information from the user in response to transmitting the registration request and to include the received stated information in the guest platform account to transform the guest platform account into a registered platform account associated with the first user. In embodiments, the registration request may be presented to the user in a graphical user interface.

In implementations, the platform account registration module may be further configured to set a new platform trigger or instruct the game provider of the first game to discontinue the instance of the game if the stated information was not received from the first user.

In implementations, the registered platform account associated with the first user retains the first identifier. In embodiments, the game request module may be further configured to, responsive to reception of a second request for access to the first game from the first user, effectuate transmission of a third platform request to the game provider of the first game, the third platform request including the first identifier in the registered platform account associated with the first user, and effectuate provision of the first game to the first user by the game provider.

These and other features and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural references unless the context dearly dictates otherwise.

DETAILED DESCRIPTION

Figure 1:
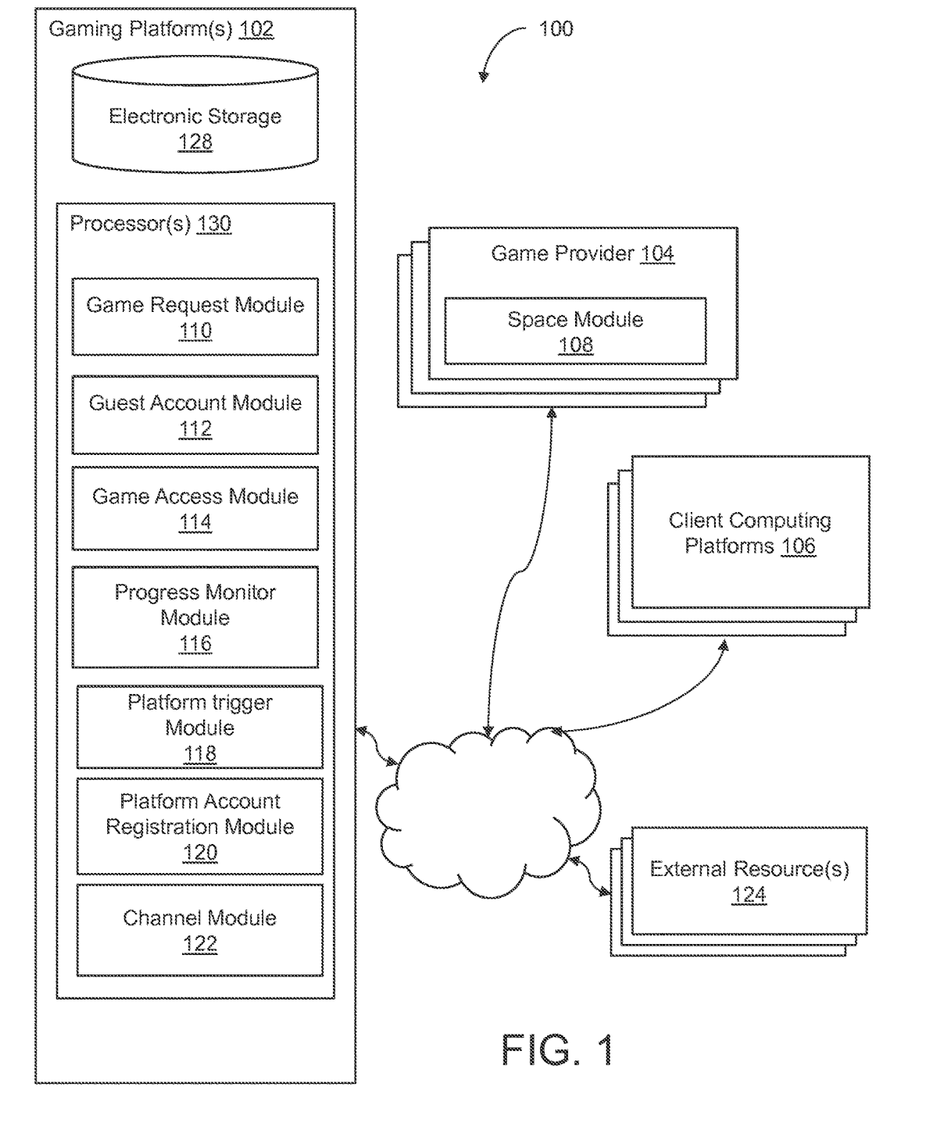
FIG. 1 illustrates a system configured to facilitate registering a platform account for a user, in accordance with one or more implementations.

FIG. 1 illustrates a system 100 configured provide a virtual space to users. Providing the virtual space may include hosting the virtual space over a network. In some implementations, system 100 may include a gaming platform 102 and a game provider 104. The gaming platform 102 may be configured to communicate with the game provider 104 and one or more client computing platforms 106 according to a client/server architecture. The users may access system 100 and/or the virtual space via client computing platforms 106.

System 100 is only one example of a suitable computing environment and is not intended to suggest any limitation as to the scope of use or functionality of the features described herein. Providing the virtual space may include hosting the virtual space over a network. In this disclosure, if an unregistered user desires access to a game associated with game provider 104, gaming platform 102 may receive a user request, create a guest platform account for the user, and provide access for the user to the game. In response to the user's usage of the game, gaming platform 102 may determine if a platform trigger is satisfied. Responsive to the platform trigger being satisfied, gaming platform 102 may generate and transmit a platform registration request to the user. Accordingly, embodiments may be configured to enable the user to access the game without the user first registering a platform account.

The gaming platform 102 is configured to host one or more games for one or more gaming provider(s) 104 and execute one or more computer program modules. In implementations, gaming platform 102 may be configured to receive user requests to provide access to a plurality of games to users. The computer program modules may include one or more of a game request module 110, a guest account module 112, a game access module 114, a progress monitor module 116, a platform trigger module 118, a platform account registration module 120, and/or a channel module 122. As noted, the client computing platform(s) 106 may include one or more computer program modules that are the same as or similar to the computer program modules of the gaming platform(s) 102 to facilitate registering a platform account for the user.

The game request module 110 may be configured to receive user requests from client computing platforms 106 for access to games hosted by gaming platform 102 to effectuate provision of a game to the user. In response to receiving a user request for access to a game, game request module 110 may determine whether a user associated with the user request has a registered account or does not have a registered account for gaming platform 102. In embodiments, if the user request does not include any stated information from the user, gaming request module 110 may determine that the user does not have a registered account for gaming platform 102. If the user request includes stated information, such as a username and password, that matches stated information for a registered user, gaming request module 110 may determine that the user does have a registered account for gaming platform 102. Responsive to reception of a request for access to the game for the registered user, the game request module 110 may effectuate transmission of a platform request to game provider 104 for access to the game. The platform request may include an identifier within the registered platform account associated with the registered user.

The game request module 110 may be also configured to access and/or manage one or more guest platform accounts and registered platform accounts associated with users of the system 100. The one or more guest accounts and registered platform accounts may include information stored by gaming platform 102, one or more of the client computing platforms 106, and/or other storage locations. The registered platform account may include, for example, stated information identifying users (e.g., a username or handle, a number, an identifier, and/or other identifying information) within the virtual space, security login information (e.g., a login code or password), an identifier associated with the user, virtual space account information, subscription information, location information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users.

The guest platform may include an identifier to associate the guest platform account with the user, but the guest platform account may not include stated information received from the user.

The channel module 122 may be configured to determine a channel that presented a link through which the user's request for access to the game was received by the game request module 110. In embodiments, the channel module 122 may also be configured to determine an internet protocol address associated with the user's request. The internet protocol address may be utilized to determine a location of the user.

The guest account module 112 may be configured to automatically create a guest platform account for the user if the user is not associated with a registered platform account. In embodiments, guest account module 112 may create the guest platform for the user in response to receipt of a user request from client computing platform 106 for a user that does not have a registered platform account. The guest platform account may be created so the user may have access to games provided by game provider(s) 104 hosted by gaming platform 102. In implementations, the created guest platform account may include an identifier to associate the guest platform account with the user. In implementations, the guest platform account may not include stated information received from the user. In further implementations, the guest platform account may also include a location of the user as determined by channel module 122.

The game access module 114 may be configured to provide access for users to a game provided by game provider 104. The game access module 114 may provide access to game in response to receiving the user request from client computing platform 106 indicating that a user desires access to the game. In embodiments, the game access module 114 may be configured to effectuate transmission of a first platform request to the game provider 104 of the game in response to receiving the user request from a user without a registered platform account. The platform request may include the identifier associated with the user.

The game access module 114 may also be configured to effectuate transmission of a second platform request to the game provider 104 of the game in response to receiving a user request for access to the game from a user with a registered platform account. In implementations, the second platform request may include an identifier associated with the registered platform account. Responsive to receiving the second platform request, the game access module 114 may effectuate provision of the game to the second user by game provider 104.

The progress monitor module 116 may be configured to monitor usage of the games. The progress monitor module 116 may be configured to monitor interactions of the users with the game, virtual space, and/or other users within the virtual space. This may include monitoring, for a given user, one or more of times at which the given user is logged in to the virtual space, areas of the virtual space the given user views or interacts with or in, other users the given user interacts with, the nature and/or content of interactions of the given user with other users, activities participated in within the virtual space, level, powers, or skill attained in the virtual space, inventory items obtained in the virtual space, and/or other interactions of the given user with the virtual space and/or other users. For a user that does not have a registered platform account, in implementations some or all of the information generated by progress monitor module 116 in monitoring the interactions of the user in the virtual space may be stored within the guest platform account associated with the user managed by guest account module 112. For a user that has a registered platform account, in implementations some or all of the information generated by progress monitor module 116 in monitoring the interactions of the user in the virtual space may be stored within the registered platform account associated with the user managed by guest access module 112. In other implementations, the progress monitor module may not monitor game usage by users having registered platform accounts.

At a given time, progress monitor module 116 may determine a set of users that are currently engaged with the virtual space and/or a set of users that are currently not engaged with the virtual space. Being engaged with the virtual space may refer to being logged in to a game account for the virtual space, performing some action or interaction within the virtual space within some period of time (e.g., the last 2 minutes), and/or other taking some other action indicating ongoing and contemporaneous engagement with the virtual space.

The platform trigger module 118 may be configured to determine whether usage of a game by a user satisfies a platform trigger. In implementations, gaming platform 102 may set the platform trigger for games provided by game provider(s) 104. By the gaming platform 102 setting the platform trigger for the games provided by game provider(s) 104, the game provider(s) 104 may not be involved in the registration process for a user accessing a game provided by the game provider(s). In embodiments, the platform trigger may vary for users and for games. For example, the platform trigger may vary based on whether the user is a paying user on another gaming platform. In implementations, the platform trigger may be based on a channel that presented a link through which the user's request to access the game by game provider 104 was received. The platform trigger may also be based on a location of the user, which may be determined based on an internet protocol address of the user's request. For example, a user request that is received via a first channel may have a platform trigger that is associated with a longer length of time or different specific in-game actions then a user request that is received via a second channel. Similarly, a user request that is received from a user at a first location may have a platform trigger that is associated with a longer length of time or different specific in-game actions then a user request that is received from a user at a second location.

The platform trigger may be based on an activity level of the user within the game. The platform trigger may be associated with one or more of a login frequency, amount of time logged in to the virtual space (e.g. two minutes, five minutes and/or any other period of time), specific in-game action, amount of time logged into the virtual space within a rolling time period (e.g., over the last day, week, month, or other rolling time period), average amount of time logged in to the virtual space over some length of time (e.g., per day, per week, and/or other length of time), average log in session time over a rolling time period, number of inter-user communications over a length of time, number of inter-user communications per log in, number of relationships with other users in the virtual space, number of new relationships with other users in the virtual space within a rolling time period, amount of real world money spent in the virtual space, an action to make a purchase associated with the virtual space, and/or other activity parameters.

The platform account registration module 120 may be configured to generate and/or transmit a platform registration request for a user in response to a determination that the platform trigger is met. The platform registration request may be an interface configured to be displayed on client computing device 106, such as a pop-up. The interface may include fields where the user may enter stated information identifying the user (e.g., a username or handle, a number, an identifier, and/or other identifying information) within the gaming platform 102, security login information (e.g., a login code or password), subscription information, relationship information (e.g., information related to relationships between users in the virtual space), location information, demographic information associated with the user, information stated by the user, purchase information of the user such as a credit card number that may be used for purchases within system 100, a phone number associated with a user, and/or other information related to the user. In response to transmitting the registration request with the interface to the user, the platform account registration module 120 may be configured to receive stated information associated with the user. Responsive to receiving the stated information associated with the user, the guest platform account for the user may be transformed into a registered platform account. The transformed registered platform account may include the stated information for the user, the identifier associated with the user, and any other information stored within the guest platform account associated with the user.

In implementations, the platform account registration module 120 may be configured to instruct the game provider 104 of the game to discontinue an instance of the game if the stated information is not received from the user in response to transmitting the registration request. In implementations, if the platform account registration module 120 does not receive stated information associated with the user in response to transmitting the registration request, the platform trigger module 118 may set a new platform trigger and the instance of the game may continue. In response to the new platform trigger being met a second registration request may be transmitted to the user.

In some implementations, the gaming platform 102, game provider 104, client computing platforms 106, and/or external resources 124 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, client computing platforms 106, and/or external resources 124 may be operatively linked via some other communication media.

A given client computing platform 106 may include one or more processors configured to execute computer program modules. The computer program modules may be configured to enable an expert or user associated with the given client computing platform 106 to interface with system 100 and/or external resources 124, and/or provide other functionality attributed herein to client computing platforms 106. By way of non-limiting example, the given client computing platform 106 may include one or more of a desktop computer, a laptop computer, a handheld computer, a tablet computing platform, a NetBook, a Smartphone, a gaming console, and/or other computing platforms.

External resources 124 may include sources of information, hosts and/or providers of virtual environments outside of system 100, external entities participating with system 100, and/or other resources. In some implementations, some or all of the functionality attributed herein to external resources 124 may be provided by resources included in system 100.

Game provider 104 may be configured to provide a game within virtual space to users. Games provided by game provider 104 may be hosted by gaming platform 102. It should be appreciated that although game provider 104 and gaming platform 102 are illustrated in FIG. 1 as being implemented within different entities, gaming platform 102 may provide the functionality of game provider 104. Game provider 104 may include space module 108.

Space module 108 may be configured to implement the instance of the virtual space executed by the computer modules. The instance of the virtual space may reflect the state of the virtual space. The instance of the virtual space may be used to push state information to clients for implementation on the clients, may be used to verify state information generated on clients executing expressions of the instance locally, and/or for other purposes. State information may include information about the state of the virtual space such as, without limitation, position information of one or more objects, topography information, object status/shape information, battle information, score information, user or character progress information, user inventory information, progress information for one or more activities or actions, view information describing a view of the virtual space, and/or other information that describes the state of the virtual space. Expressions of the instance executed on the clients facilitate presentation of views on the clients of the virtual space. Expressions of the instance executed on the clients may be configured to simply present views of the virtual space based on the state information (e.g., via streaming view information, object/position information, and/or other state information) received from space module 108. Expressions of the instance executed on the clients may include space logic that effectively provides for execution of a limited version of the instance on a client that is synchronized and/or verified with state information received from space module 108. The view presented on a given client may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platforms 106) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the views of the virtual space determined from the instance executed by space module 108 is not intended to be limiting. The virtual space may be presented in a more limited, or more rich, manner. For example, views of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other representations of individual places within the virtual space are contemplated.

Within the instance of the virtual space executed by space module 108, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 106. The users may interact with each other through communications exchanged within the virtual space. Such communications may include one or more of textual chat, instant messages, private messages, voice communications, and/or other communications. Communications may be received and entered by the users via their respective client computing platforms 106. Communications may be routed to and from the appropriate users through gaming provider 104 to gaming platform 102 (e.g., through space module 108) or may be routed directly.

Gaming platform 102 may include electronic storage 128, one or more processors 130, and/or other components. Gaming platform 102 may include communication lines, or ports to enable the exchange of information with a network and/or other computing platforms. Illustration of gaming platform 102 in FIG. 1 is not intended to be limiting. Gaming platform 102 may include a plurality of hardware, software, and/or firmware components operating together to provide the functionality attributed herein to gaming platform 102. For example, gaming platform 102 may be implemented by a cloud of computing platforms operating together as gaming platform 102.

Electronic storage 128 may comprise non-transitory storage media that electronically stores information. The electronic storage media of electronic storage 128 may include one or both of system storage that is provided integrally (i.e., substantially non-removable) with gaming platform 102 and/or removable storage that is removably connectable to gaming platform 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 102 may store software algorithms, information determined by processor 130, information received from gaming platform 102, information received from client computing platforms 106, and/or other information that enables gaming platform 102 to function as described herein.

Processor(s) 130 is configured to provide information processing capabilities in gaming platform 102. As such, processor 130 may include one or more of a digital processor, an analog processor, a digital circuit designed to process information, an analog circuit designed to process information, a state machine, and/or other mechanisms for electronically processing information. Although processor 130 is shown in FIG. 1 as a single entity, this is for illustrative purposes only. In some implementations, processor 130 may include a plurality of processing units. These processing units may be physically located within the same device, or processor 130 may represent processing functionality of a plurality of devices operating in coordination. The processor 130 may be configured to execute modules 110, 112, 114, 116, 118, 120, and 122. Processor 130 may be configured to execute modules 110, 112, 114, 116, 118, 120, and 122 by software; hardware; firmware; some combination of software, hardware, and/or firmware; and/or other mechanisms for configuring processing capabilities on processor 130. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 110, 112, 114, 116, 118, 120, and 122 are illustrated in FIG. 1 as being implemented within a single processing unit, in implementations in which processor 130 includes multiple processing units, one or more of modules 110, 112, 114, 116, 118, 120, and 122 may be implemented remotely from the other modules. The description of the functionality provided by the different modules 110, 112, 114, 116, 118, 120, and 122 described below is for illustrative purposes, and is not intended to be limiting, as any of modules 110, 112, 114, 116, 118, 120, and 122 may provide more or less functionality than is described. For example, one or more of modules 110, 112, 114, 116, 118, 120, and 122 may be eliminated, and some or all of its functionality may be provided by other ones of modules 110, 112, 114, 116, 118, 120, and 122. As another example, processor 130 may be configured to execute one or more additional modules that may perform some or all of the functionality attributed below to one of modules 110, 112, 114, 116, 118, 120, and 122.

Figure 2:
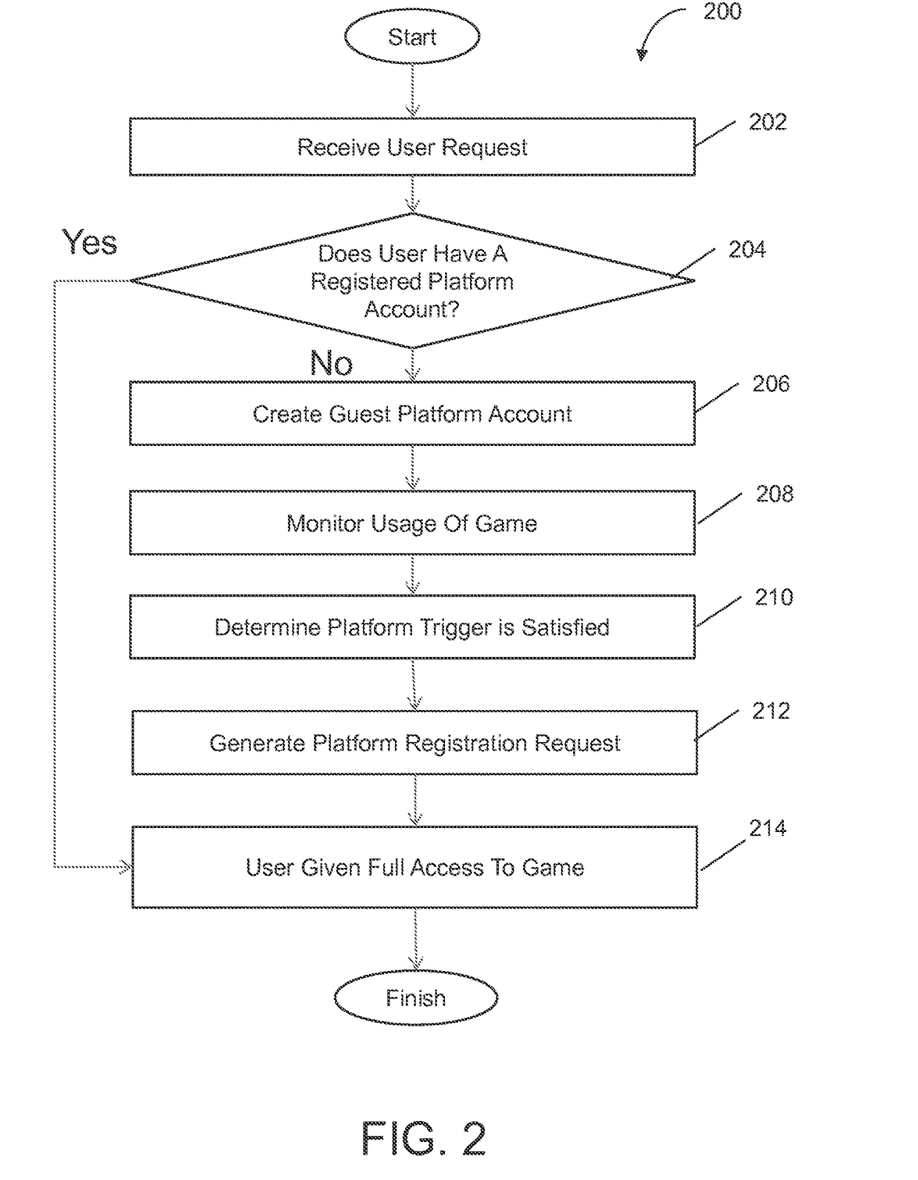
FIG. 2 illustrates a method of registering a user to a gaming platform in response to receiving a request to access a game

FIG. 2 illustrates a method of registering a user to a gaming platform in response to receiving a request to access a game. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and described below is not intended to be limiting.

In some embodiments, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, a user request for access to games hosted by a gaming platform may be received. The user request may include an identifier associated with a specific game of the plurality of games that a user desires access to. Operation 202 may be performed by a game request module that is the same as or similar to game request module 110, in accordance with one or more implementations.

At an operation 204, in response to receiving the user request for access to at least one game, it may be determined whether the user making the user request is associated with a registered platform account. It may be determined if the user request is associated with a registered platform account based on whether the user request includes stated information from the user, such as a username and password. If the user request includes stated information that matches information for a registered platform account, it may be determined that the user making the user request has a registered platform account. If the user request does not include any stated information from the user, it may be determined that the user does not have a registered platform account. Operation 204 may be performed by a game request module that is the same as or similar to game request module 110, in accordance with one or more implementations.

At an operation 206, responsive to a determination that the user associated with the user request does not have a registered platform account at operation 204, a guest platform account may be automatically created for the user. In implementations, the created guest platform account may include an identifier for the user but may not include stated information received from the user. The identifier may be retained when and if the guest platform account is transformed into a registered platform account. Operation 206 may be performed by a game request module that is the same as or similar to guest account module 112, in accordance with one or more implementations.

At an operation 208, the user may be given access to the game identified in the user request at operation 202. Responsive to the user accessing the game, the user's interactions in the virtual space may be monitored. The user's actions in virtual space may be stored within the created guest platform account for the user. Operation 208 may be performed by a game request module that is the same as or similar to guest account module 112, in accordance with one or more implementations.

At an operation 210, it may be determined that the user's usage of the game satisfies a platform trigger. The platform trigger may be set by the gaming platform and may be based on an activity level or specific activities of the user within the virtual space. In implementations, the platform trigger may be associated with an amount of time that the user was logged into the virtual space or with specific in-game actions. Operation 210 may be performed by a platform trigger module that is the same as or similar to platform trigger module 118, in accordance with one or more implementations.

At an operation 212, a platform registration request may be generated and transmitted to the user in response to a determination that the platform trigger is met. In implementations, the platform registration request may be presented to the user as an interface with fields where the user may enter stated information, such as a username and password. In response to transmitting the platform registration request to the user, the user may enter stated information within the fields on the interface, and the stated information associated with the user may be received. Responsive to receiving the stated information, the guest platform account for the user may be transformed into a registered platform account for the user. The registered platform account may include the stated information for the user, the identifier for the user within the guest account, and any other information stored within the guest platform account. Operation 212 may be performed by a platform account registration module that is the same as or similar to platform account registration module 120, in accordance with one or more implementations.

At an operation 214, responsive to the user having a registered platform account at operations 204 or 212, the user may be given full access to the identified game in the user request. Operation 214 may be performed by a game request module that is the same as or similar to game request module 110, in accordance with one or more implementations.

Figure 3:
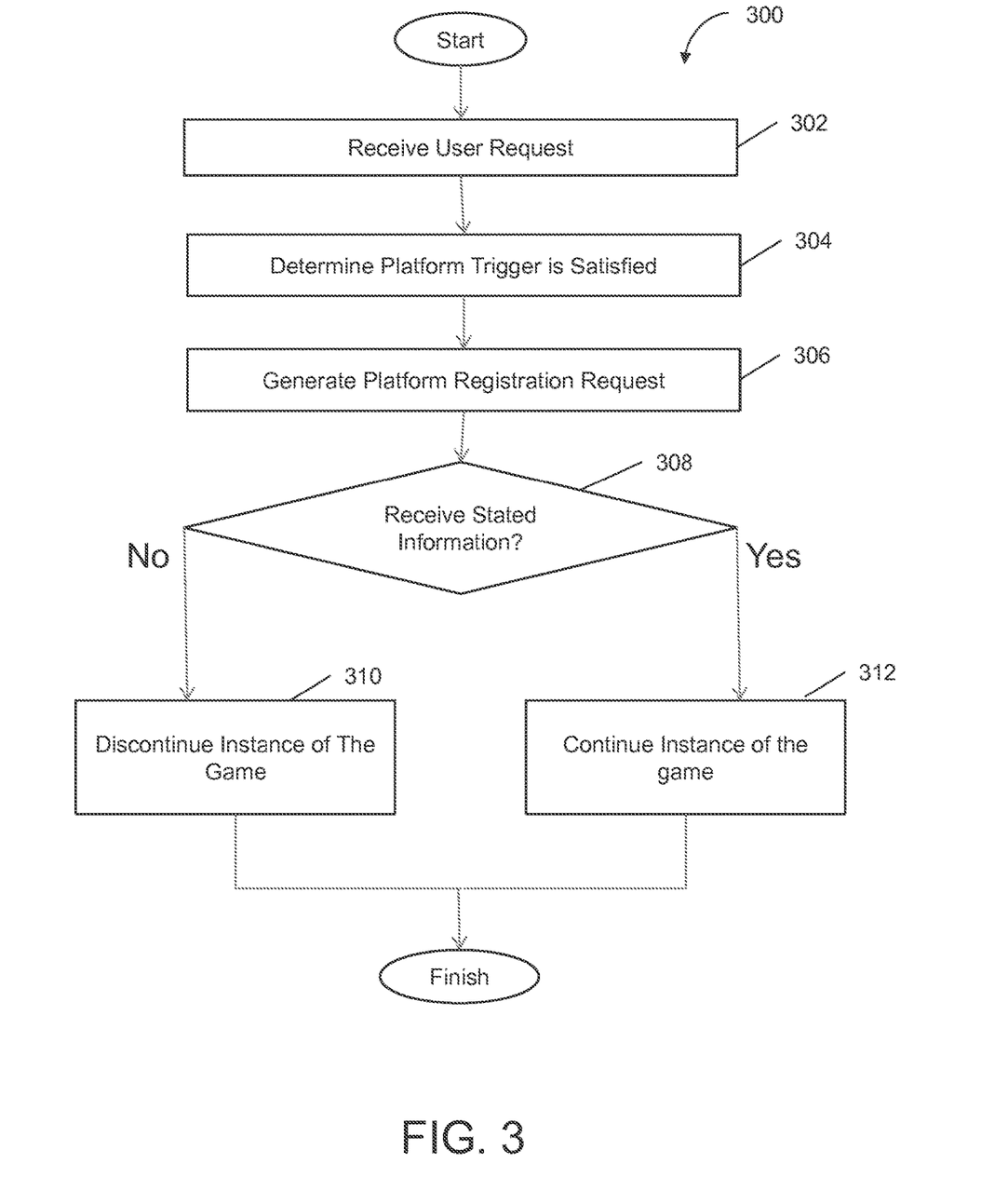
FIG. 3 illustrates a method for enabling an unregistered user to access a game.

FIG. 3 illustrates a method 300 of registering a user to a gaming platform in response to receiving a user request to access a game. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, a user request for access to game may be received from an unregistered user. The user request may include an identifier associated with a game of the plurality of games hosted by a gaming platform and may not include any stated information from the user. Responsive to a determination that the user associated with the user request does not have a registered platform account, a guest platform account may be automatically created for the user. In embodiments, the created guest platform account may include an identifier associated with the user. In implementations, the guest platform account may not include stated information received from the user. Operation 302 may be performed by a game request module and/or game account module that is the same as or similar to game request module 110 and/or game account module 112, in accordance with one or more implementations.

At an operation 304, it may be determined that the user's usage of the game satisfies a platform trigger. The platform trigger may be a trigger set by a gaming platform, which may be based on an activity level or specific activities of the user within the virtual space. In embodiments, the platform trigger may be associated with an amount of time that the user was logged in the virtual space or with specific in-game actions. Operation 304 may be performed by a platform trigger module that is the same as or similar to platform trigger module 118, in accordance with one or more implementations.

At an operation 306, a platform registration request for the user may be generated and transmitted to the user in response to a determination that the platform trigger is met. In implementations, the platform registration request may be presented to the user as an interface with fields where the user may enter stated information, such as a username and password. Operation 306 may be performed by a platform account registration module that is the same as or similar to platform account registration module 120, in accordance with one or more implementations.

At an operation 308, a determination may be performed of whether stated information is received from the user in response to transmitting the platform registration request at operation 306. Operation 308 may be performed by a platform account registration module that is the same as or similar to platform account registration module 120, in accordance with one or more implementations.

Responsive to a determination that stated information was not received from the user, method 300 may proceed to an operation 310. At operation 310, a new platform trigger may be set or instructions may be transmitted to the game provider of the game to discontinue the instance of the game. Operation 310 may be performed by a platform account registration module that is the same as or similar to platform account registration module 120, in accordance with one or more implementations.

Returning to operation 308, responsive to a determination that stated information was received from the user, method 300 may proceed to an operation 312. At operation 312, the user may continue to have access to the game provided by a game provider. Further at operation 312, responsive to receiving the stated information, the guest platform account for the user may be transformed into a registered platform account for the user. The registered platform account may include the stated information for the user, the identifier for the user within the guest account, and any other information stored within the guest platform account. Operation 312 may be performed by a platform account registration module that is the same as or similar to platform account registration module 120, in accordance with one or more implementations.

Figure 4:
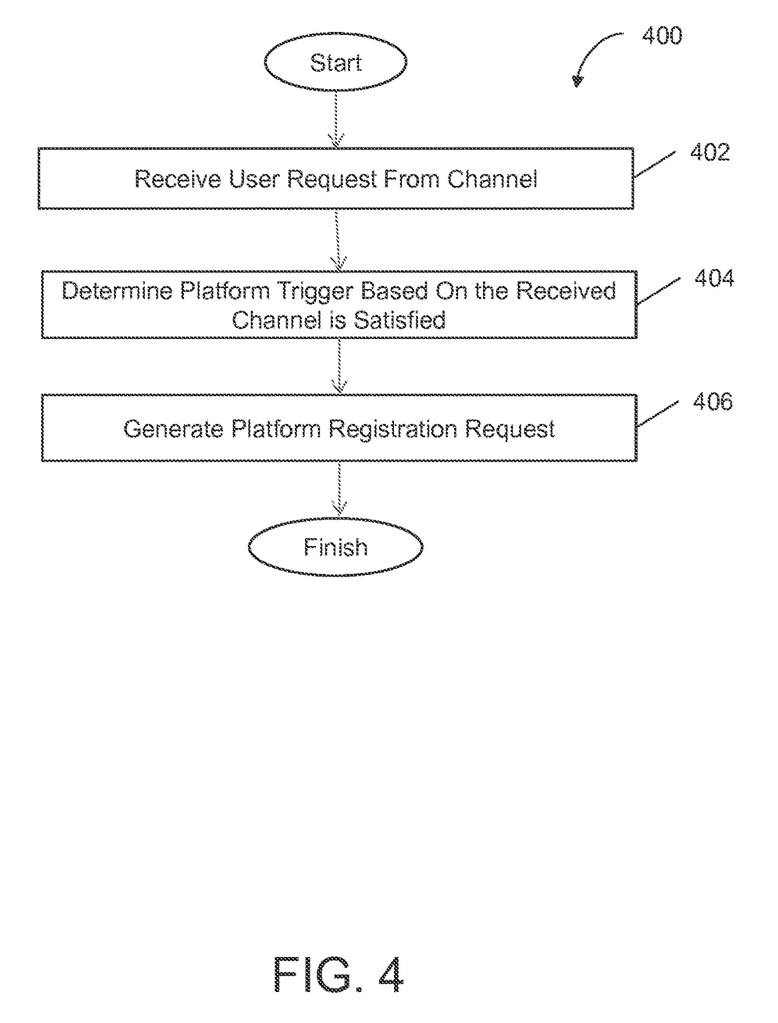
FIG. 4 illustrates a method for registering a user for a platform account if a platform trigger that is associated with user request characteristics is satisfied, in accordance with one or more implementations.

FIG. 4 illustrates a method 400 of registering a user to a gaming platform in response to receiving a request to access a game. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

In some embodiments, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At an operation 402, a user request from an unregistered user for access to games hosted by a gaming platform may be received. The user request may include an identifier associated with a specific game of the plurality of games that a user desires access to, an identifier associated with a channel that presented a link through which the user's request for access to the game was received, and/or an internet protocol address identifying the location of the user. Responsive to receiving the user request from a user that does not have a registered platform account, a guest platform account may be automatically created for the user. Operation 402 may be performed by a game request module and/or a channel module that are the same as or similar to game request module 110 and/or channel module 122, in accordance with one or more implementations.

At an operation 404, it may be determined that the user's usage of the game satisfies a platform trigger. The platform trigger may be based on an activity level or specific activities of the user within the virtual space, and may vary based on the location of the user and/or the channel that presented the link through which the user request for access to the game was received. Operation 404 may be performed by game request module and/or a channel module that are the same as or similar to game request module 110 and/or channel module 122, in accordance with one or more implementations.

At an operation 406, a platform registration request for the user may be generated and transmitted to the user in response to a determination that the platform trigger based on the channel that the user request was received from and/or the location of the user is met. In embodiments, the platform registration request may be presented to the user as an interface with fields where the user may enter stated information, such as a username and password. In response to transmitting the platform registration request to the user, stated information associated with the user may be received from the user. Responsive to receiving the stated information, the guest platform account for the user may be transformed into a registered platform account for the user including the stated information for the user, the identifier within the guest platform account, and any other information stored within the guest platform account. Operation 406 may be performed by a platform account registration module that is the same as or similar to platform account registration module 120, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for in-game, platform-triggered game platform registration, the system comprising:
   one or more processors configured by machine-readable instructions to:

host, via a network, a platform providing users access to multiple games that are provided by multiple different game providers that are separate from the platform, the multiple different game providers including a first game provider;

receive user requests for access through the platform to play one or more of the multiple games;

determine whether users making the user requests are associated with registered platform accounts associated with the platform, wherein the platform accounts enable the users to log in to the platform and access the multiple games that are hosted on the platform, and wherein respective individual game accounts enable the users to access respective individual ones of the multiple games;

automatically create, responsive to reception of a first user request from a first user through the platform to play a first game provided by the first game provider, a guest platform account for the first user, wherein the first user is not yet associated with any registered platform account at a time of the reception of the first user request, wherein the guest platform account includes a first identifier and lacks any registration information provided by the first user, and wherein the first game is one of the multiple games hosted by the platform via the network;

provide access for users to one or more of the multiple games provided by the multiple different game providers in response to received user requests for access to one or more of the multiple games, such that:

(i) responsive to the reception of the first user request from the first user through the platform to play the first game, transmission of a first platform request is effectuated from the platform to the first game provider, the first platform request including the first identifier and effectuating provision of the first game to the first user by the first game provider, and (ii) responsive to reception of a second user request for access to the first game from a second user that is associated with a second registered platform account, transmission of a second platform request is effectuated from the platform to the first game provider, the second platform request including a second identifier from registration data associated with the second registered platform account and effectuating provision of the first game to the second user by the first game provider;

monitor user usage of one or more of the multiple games such that responsive to access to the first game being provided to the first user, usage of the first game by the first user is monitored;

determine whether usage of the first game by the first user satisfies a platform trigger based on an occurrence within the first game, wherein the platform trigger is satisfied by the first user initiating an in-game purchase from the first game provider, the in-game purchase occurring virtually within the first game for a virtual, in-game item usable in the first game;

generate a platform registration request for the first user in response to a determination that the platform trigger is met, wherein the platform registration request causes registration information to be requested from the first user; and register, for the first user, a first registered platform account with the platform, wherein the first registered platform account is associated with the registration information.

2. The system of claim 1, wherein the one or more processors are further configured by machine-readable instructions to:

determine a channel that presented a link through which the first user request from the first user through the platform to play the first game was received, and to include the determined channel in the guest platform account, wherein the platform trigger is based on the channel.

3. The system of claim 2, wherein the one or more processors are further configured by machine-readable instructions to determine an internet protocol address associated with the first user, and to include the determined internet protocol address in the guest platform account, wherein the platform trigger is based on a location associated with the internet protocol address.

4. The system of claim 1, wherein the one or more processors are further configured by machine-readable instructions to:

receive stated information from the user in response to transmitting the platform registration request that causes the registration information to be requested from the user; and use the received stated information to transform the guest platform account into the first registered platform account associated with the first user, wherein the platform registration request is presented to the user in a graphical user interface.

5. The system of claim 4, wherein the one or more processors are further configured by machine-readable instructions to set a new platform trigger or instruct the first game provider of the first game to discontinue an instance of the game if the stated information was not received from the first user.

6. The system of claim 4, wherein the first registered platform account associated with the first user retains the first identifier, and wherein the one or more processors are further configured by machine-readable instructions to, responsive to reception of a third user request for access to the first game from the first user, effectuate transmission of a third platform request to the first game provider of the first game, the third platform request including the first identifier in the first registered platform account associated with the first user, and effectuate provision of the first game to the first user by the first game provider.

7. A computer-implemented method for in-game, platform-triggered game platform registration, the method being implemented in a computer system that includes one or more physical processors configured by machine-readable instructions, the method comprising:

hosting, via a network, a platform providing a first user access to multiple games that are provided by multiple different game providers that are separate from the platform, the multiple different game providers including a first game provider;

receiving from the first user, at the one or more physical processors, a first user request for access through the platform to play a first game, wherein the first user is not yet associated with any registered platform account when the first user request for access is received, wherein the first game is one of the multiple games that are hosted on the platform, and wherein platform accounts associated with the platform enable users to access the multiple games that are hosted on the platform, and wherein respective individual game accounts enable the users to access respective individual ones of the multiple games;

creating, by the one or more physical processors in response to reception of the first user request from the first user, a guest platform account for the first user, wherein the guest platform account includes a first identifier and lacks any registration information provided by the first user;

effectuating transmission, by the one or more physical processors, of a first platform request from the platform to the first game provider responsive to receipt of the first user request for access, the first platform request including the first identifier and effectuating provision of the first game to the first user by the first game provider;

receiving, by the one or more physical processors, a second user request for access to the first game from a second user who is associated with a second registered platform account and who previously provided second registration information to the platform, wherein the second registered platform account is associated with a second identifier;

effectuating transmission, by the one or more physical processors, of a second platform request to the first game provider, the second platform request including the second identifier and effectuating provision of the first game to the second user by the first game provider;

monitoring, by the one or more physical processors, usage of the first game by the first user responsive to access to the first game being provided to the first user;

determining, by the one or more physical processors, whether usage of the first game by the first user satisfies a platform trigger based on an occurrence within the first game, wherein the platform trigger is satisfied by the first user initiating an in-game purchase from the first game provider, the in-game purchase occurring within the first game for a virtual, in-game item useable in the first game;

generating, by the one or more physical processors, a platform registration request for the first user in response to a determination that the platform trigger is met, wherein the platform registration request causes registration information to be requested from the first user; and registering, for the first user, a first registered platform account with the platform, wherein the first registered platform account is associated with the registration information.

8. The method of claim 7, further comprising:
determining, by the one or more physical processors, a channel that presented a link through which the first user request for access through the platform to play the first game was received; and
including, by the one or more physical processors, the determined channel in the guest platform account;
wherein the platform trigger is based on the channel.

9. The method of claim 8, further comprising:
determining, by the one or more physical processors, an internet protocol address associated with the first user; and
including the determined internet protocol address in the guest platform account;
wherein the platform trigger is based on a location associated with the internet protocol address.

10. The method of claim 7, further comprising:
receiving, at the one or more physical processors, stated information from the user in response to transmitting the registration request; and
using, by the one or more physical processors, the received stated information to transform the guest platform account into the first registered platform account associated with the first user;
wherein the registration request is presented to the user in a graphical user interface.

11. The method of claim 10, wherein the first registered platform account associated with the first user retains the first identifier, and further comprising receiving a second request for access to the first game from the first user, effectuating transmission of a third platform request to the first game provider of the first game, the third platform request including the first identifier in the first registered platform account associated with the first user, and effectuating provision of the first game to the first user by the first game provider.

12. The method of claim 7, further comprising:
determining, by the one or more physical processors, that information was not received from the first user in response to the platform registration request; and
setting, by the one or more physical processors, a new platform trigger or instructing the first game provider of the first game to discontinue an instance of the first game.

13. A system for in-game, platform-triggered game platform registration, the system comprising:
one or more processors configured by machine-readable instructions to:
automatically create, responsive to reception of a first user request from a first user for access to a first game, a guest platform account for the first user when the first user is not yet associated with any registered platform account at a time of the reception of the first user request, wherein the guest platform account includes a first identifier and lacks any registration information provided by the first user, wherein the first game is one of multiple games that are hosted by a game platform via a network, wherein the multiple games are provided by multiple game providers, wherein the multiple game providers are separate from the game platform, wherein the first game is provided by a first game provider of the multiple game providers, wherein platform accounts associated with the game platform enable users to access the multiple games, and wherein respective individual game accounts enable the users to access respective individual ones of the multiple games accessible via the platform account;
responsive to the reception of the first user request from the first user for access to the first game, effectuate transmission of a first platform request to the first game provider of the first game, wherein the first platform request includes the first identifier, and wherein the first platform request is used in effectuating provision of the first game to the first user;
responsive to reception of a second user request for access to the first game from a second user who is associated with a second registered platform account, effectuate transmission of a second platform request to the first game provider of the first game, wherein the second platform request includes a second identifier that is associated with the second registered platform account, and wherein the second user previously provided information during platform registration of the second user;
effectuate provision of the first game from the game provider to the second user;
monitor user usage of the games such that responsive to the provision of the first game to the first user, usage of the first game by the first user is monitored;
determine whether usage of the first game by the first user satisfies a platform trigger based on an occurrence in the first game, wherein the platform trigger is satisfied by the first user initiating an in-game purchase from the first game provider, the in-game purchase occurring within the first game for a virtual, in-game item useable within the first game;
generate a platform registration request for the first user in response to a determination that the platform trigger is met, wherein the platform registration request causes registration information to be requested from the first user; and
register, for the first user, a first registered platform account with the game platform, wherein the first registered platform account is associated with the registration information.

14. The system of claim 13, wherein the one or more processors are further configured by machine-readable instructions to receive stated information from the user in response to transmitting the registration request and to include the received stated information to transform the guest platform account into the first registered platform account associated with the first user, wherein the registration request is presented to the user in a graphical user interface.

* * * * *